United States Patent [19]

Prodel

[11] Patent Number: 4,832,171
[45] Date of Patent: May 23, 1989

[54] INSTALLATION FOR ASSEMBLING AND/OR MACHINING PARTS CARRIED ON PALLETS, AND A PALLET FORMING A PART OF SAID INSTALLATION

[76] Inventor: Jacques M. Prodel, Rue de Cuts - Carlepont - F 60170, Ribecourt, France

[21] Appl. No.: 924,485

[22] Filed: Oct. 29, 1986

[30] Foreign Application Priority Data

Oct. 29, 1985 [FR] France ................................. 85 16095
Apr. 21, 1986 [FR] France ................................. 86 05729

[51] Int. Cl.4 ............................................ B65G 37/00
[52] U.S. Cl. ..................................... 198/349; 104/165
[58] Field of Search ............. 198/346.1, 465.2, 803.01, 198/349, 472; 104/165; 105/165

[56] References Cited

U.S. PATENT DOCUMENTS 3,088,197  5/1963  Cargill .
3,767,025 10/1973  Louis ..................... 198/19
4,513,854  4/1985  Prodel et al. ............. 198/472
4,519,491  5/1985  Prodel et al. ............. 198/349

FOREIGN PATENT DOCUMENTS 0050080  4/1982  European Pat. Off. .
0088680  9/1983  European Pat. Off. .
0115357  8/1984  European Pat. Off. .
1267608  5/1968  Fed. Rep. of Germany .
1658299  9/1970  Fed. Rep. of Germany .
2752268  6/1979  Fed. Rep. of Germany .
7318006 12/1973  France .
8304172 11/1984  France .

Primary Examiner—Joseph F. Peters, Jr.
Assistant Examiner—Jesûs D. Sotelo
Attorney, Agent, or Firm—Pollock, Vande Sande & Priddy

[57] ABSTRACT

A system for anually and/or automatically processing and/or machining parts includes at least one work station or module, together with substantially rectangular pallets movable through such work station or module under the action of friction between pallets and one or more drive strands of an endless belt or the like. The system includes a base or floor and each of the pallets includes both swivel wheels suitable for running on the base or floor and a resilient friction traction member disposed at each of its corners and suitable for pressing resiliently against drive strand(s) to obtain continuous drive for the pallet and to enable it to change direction with or without changing its absolute orientation.

18 Claims, 4 Drawing Sheets

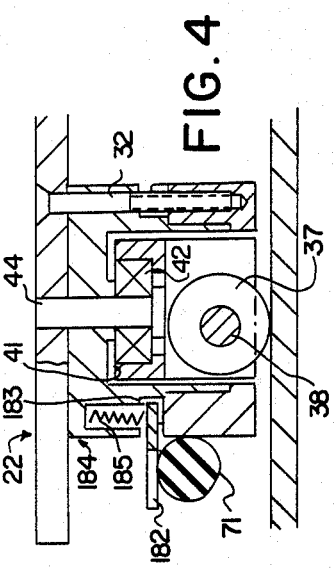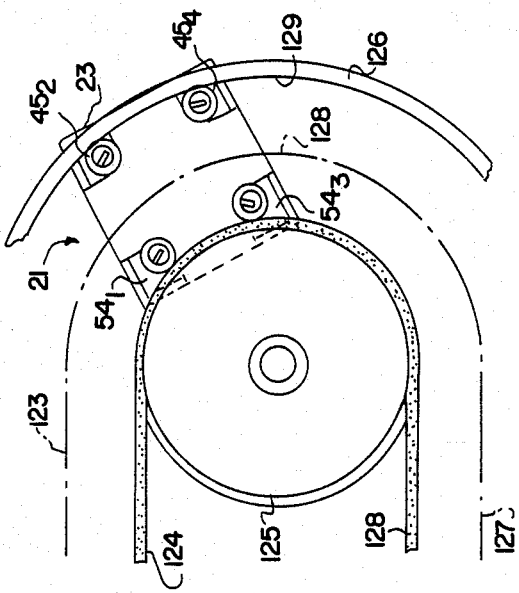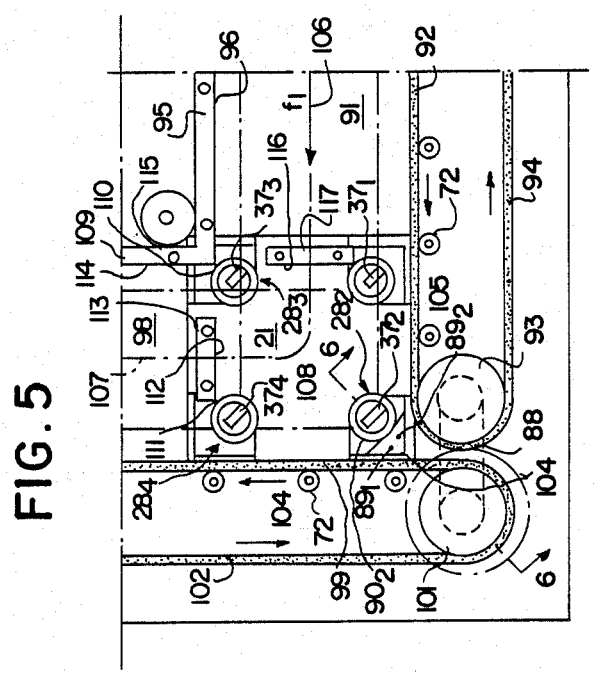

INSTALLATION FOR ASSEMBLING AND/OR MACHINING PARTS CARRIED ON PALLETS, AND A PALLET FORMING A PART OF SAID INSTALLATION

The present invention relates to systems for assembling and/or machining parts carried on pallets which travel along paths for conveying these parts to work stations for assembly and/or machining, with a pallet generally being held stationary during assembly and/or machining and being moved by drive means to convey these parts to another work station for further assembly and/or machining until all of the assembly and machining operations have been performed (manually or automatically) on the part and the part has been delivered.

BACKGROUND OF THE INVENTION

Such installations are being used more and more widely, in particular for making flexible workshops, for example workshops capable of being quickly and easily adapted to different parts and to different types of processing.

An important purpose of the present invention is to provide a flexible installation which is very versatile, and is more easily adaptable to a wide variety of uses than prior known installations.

A particular purpose of the present invention is to provide such an installation in which pallets can be used either to travel with constant orientation or to travel with the orientation of the pallet changing on occasion, for example in order to present the parts they carry in a desired orientation to machines or workers for assembly or machining.

Another purpose of the present invention is to provide such an installation in which changes in the direction of pallet movement take place without shock when a pallet passes from a first path to a perpendicular path.

Another purpose of the present invention is to provide such an installation which is capable of processing relatively heavy parts without difficulty and without problems associated with driving and/or stopping each pallet, and avoiding accidents specifically due to the high mass of the parts carried by the pallets.

Another purpose of the invention is to provide an installation which is simple to construct, and therefore not very expensive, and which operates reliably.

Another purpose of the invention is to provide such an installation in which the pallets move at very high speed so as to follow one another rapidly and thus keep the various work stations supplied without significant interruption, including when the pallet paths include very many crossovers and/or simple corners and/or perpendicular changes of direction.

SUMMARY OF THE INVENTION

The present invention provides an installation for manually and/or automatically processing and/or machining parts, the installation including at least one work station or module, together with generally rectangular pallets movable through at least one work station or module under the action of friction between the pallets and one or more drive strands of an endless belt or the like, the installation comprises the improvements including base or floor, and each of the pallets including firstly running means suitable for rumming on the base or floor, and secondly a resilient friction traction member disposed at each of its corners and suitable for pressing resiliently against the drive strands(s) to obtain continuous drive for the pallet and to enable it to change direction with or without changing its absolute orientation.

BRIEF DESCRIPTION OF THE DRAWINGS

Various embodiments of the present invention are described below by way of example with reference to the accompanying drawings in which:

FIG. 4 is a section showing a variant friction contact flap;

FIG. 5 is a plan view, seen from below, of a portion of a station or module in an installation showing a pallet at a location where its path changes direction, with the floor being assumed to be transparent;

FIG. 6 is a section on line 6—6 of FIG. 5, and on a larger scale;

FIG. 7 is a plan view showing a pallet running around a curved portion of path;

DETAILED DESCRIPTION OF THE PREFERRED EMBODIMENT

Figure 3:
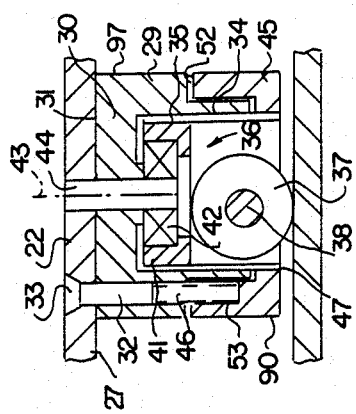
FIG. 3 is a section analogous to a portion of FIG. 1 but taken at 90° thereto.

A pallet 21 in accordance with the present invention comprises a table 22 of rectangular outline (for example a square table) delimited by sides 23, 24, 25, and 26. A leg 28 is fixed to the bottom face 27 of the table in the vicinity of each of its corners, with each of the legs comprising a cylindrical tumbler-shaped body 29 with an end disk 30 whose top face 31 is applied against the bottom face 27 of the table 22 by means of at least one screw 32 having a head 33. The body 29 extends in the form of a cylindrical skirt 34 which, together with the disk 30, provides a housing 35 in which running means 36 are received. The running means 36 comprise a wheel 37 which is mounted to rotate about a horizontal axis 38 by means of ball bearings. The running means 36 are fixed to the outer ring 41 of ball bearing 42 having a vertical axis 43 and mounted on a shaft 44 passing through the table 22 and the end disk 30. The horizontal axis 38 is offset from the vertical axis, 43, the axes do not cross each other, thereby ensuring that each running means is free to swivel, caster-like.

The skirt 34 is terminated by a ring 45 which is fixed to the body 29 by the threaded end portion 46 of the screw 32, the ring providing a circular central opening 47 through which the running means 36 project.

A plate 54 of resilient material, and advantageously of steel, is clamped between the annular front face 51 of the body 29 and the top edge 52 of the ring 45, for example by the threaded portion 46 of each screw 32 co-operating with corresponding tapped holes 53 in the ring. The plate is substantially square in outline having two external rectilinear sides 55 and 56, and two internal sides 57 and 58 which are interconnected by a circular arc 59 having the same radius as the body 29 and the ring 45 of the leg 28. The edges of the sides 55 and 56 are slightly raised with the angle between the oblique portions 61 and the horizontal portions 62 being about 15 degrees.

The margins 63 and 64 adjacent to the sides 55 and 56 of the plate 54 are coated with a material for giving the plate a suitable coefficient of friction, for example RILSAN (registered trademark).

A pallet 21 fitted with legs 28 in this manner thus has two mutually perpendicular margins in the vicinity of each of its corners, which margins are suitable for driving the pallet by rubbing against one or more moving strands, for example strands of endless belts.

Figure 1:
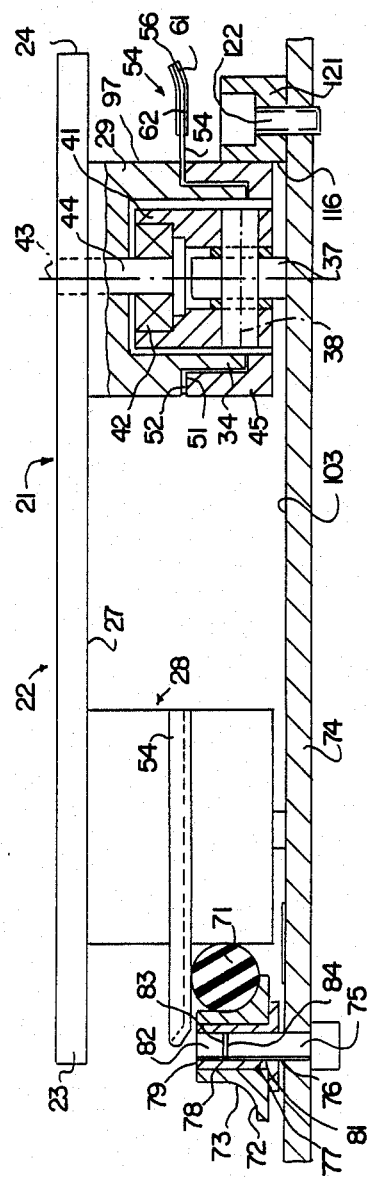
FIG. 1 is an elevation view in partial section of a pallet in accordance with the present invention and travelling along a floor of an installation.

FIG. 1 shows one such pallet with a left-hand leg 28 cooperating with a strand of endless belt 71, which strand of belt presses against a guide wheel 72 having a concave profile 73 and mounted above a floor 74 of a work station or module constituting a portion of the installation. The height at which each guide wheel is mounted above the floor is adjustable by means of a screw 75 whose threaded rod 76 co-operates with an internal tapping 77 of an intermediate part 78 having a cylindrical body 79 and a bottom annular flange 81, with the position of the intermediate part being fixed by a top screw 82 co-operating with the tapping and being screwed down into the bore until its bottom face 83 comes into abutment with the top face 84 of the threaded rod 76. The guide wheel 72 is rotatably mounted on the intermediate part 78.

In order to move the pallet 21 over the floor 74, the pallet stands on the floor by means of the running devices including wheels 37-1, 37-2, 37-3, and 37-4 and little force is required to move the pallet because it is mounted on free-running ball-bearing means. The pallet is driven by a strand of belt 71 co-operating with the resilient plates 54 having Rilsan-coated margins, and the height of the guide wheels 72 is adjusted so that adequate pressure exists between the drive belt and the RILSAN-coated margins to ensure that load-carrying pallets are driven by the belt. This pressure is relatively low and the drive force is kept to a minimum in a manner which is made independent from irregularities in construction by suitably adjusting the positions of the guide wheels 72.

This pressure is adjusted as a function of the weight of the pallets in order to ensure that they are reliably driven with minimum force.

Advantageously, the friction traction force is adjusted to the minimum possible value. It has been observed that a force of about 200 g (grams) is sufficient to drive both empty and loaded pallets in an installation. When waiting pallets line up in such an installation because of the various work stations or modules operating at various different rates of assembly and/or machining, the pallets then bump into one another with the smallest amount of shock that can be obtained.

The present invention also relates to an embodiment (not shown) in which the friction drive plate is circular in outline.

In the embodiment shown in FIG. 4 the plate is replaced by a flap 182 which is not itself resilient, but which is resiliently mounted. The flap is mounted to a smaller diameter portion 183 of a leg 184 so that the outer end of the flap is free to move up and down, and the flap is subjected to the action of three coil springs 185 distributed around the narrower portion or core 183 of the leg and housed in respective sockets 186. The springs provide the flap 182 with the necessary pressure to press against the drive strand 71.

Reference is now made to FIGS. 5 and 6. In FIG. 5, arrow f1 shows the direction in which a pallet 21 travels along a path 91. This path is delimited firstly by a strand 92 of an endless belt passing over a pulley 93 and then having a strand 94 running parallel to the first strand 92. As it travels along the path 91, the pallet is guided by a guide strip 95 fixed on the top face of the floor 74 and having its inner vertical face 96 rubbing against the cylindrical surfaces $97_3$ and $97_4$ of legs $28_3$ and $28_4$.

The path 91 is continued by a path 98 which is perpendicular thereto. The path 98 is delimited by a strand 99 of a second pallet-driving belt passing over a pulley 101 which is driven by a motor 100, and which also separates the belt into a first strand and a second strand 102. The drive strand 99 of the belt is guided by guide wheels 72.

The pulley 93 is driven by the motor 100 by means of an intermediate belt 88.

At the intersection between the two paths 91 and 98, and on the outside angle of the intersection, there is a connection abutment 104 having a curved face 105 fixed to the top face 103 of the floor 74 by screws $89_1$ and $89_2$. The curved face is circularly cylindrical and its axis is located on the diagonal of the square defined by the outline of the pallet 21 when the cylindrical surface $90_2$ of its ring $45_5$ co-operates with the abutment.

In this position, the pallet 21 is first subjected to drive from the strand 92 which co-operates with the edge $55_2$ of the plate $54_2$, and secondly it is subjected to drive from the perpendicular strand 99 which co-operates with the perpendicular edge $56_2$ of the plate.

The curved abutment face 105 co-operating with the leg $28_2$ determines the trajectory of the pallet such that the center of the pallet has a rectilinear portion 106 corresponding to the path 91 and a rectilinear portion 107 perpendicular to the first portion 106 and corresponding to the path 98, with the two rectilinear portions being interconnected by a quarter-circle portion 108 as shown diagrammatically by the dot-dashed line representative of the trajectory of the center of the pallet in FIG. 5.

In the transition phase between the first portion 106 of the trajectory and the second portion 107, the leg $28_3$ of the pallet co-operates with the corner edge 110 between the guide strip 95 and a perpendicular guide strip 109. The leg $28_4$ co-operates with the end 111 of the face 112 of the strip 113 fixed on the floor 75 and contributing to maintaining the trajectory along arrow $f_1$ in the last part of its travel along the path 91. In the perpendicular path, the pallet 21 maintains the same orientation by virtue of its leg $28_3$ co-operating with the face 114 of a guide strip 115, and by its leg $28_1$ co-operating with the face 116 of a guide strip 117 which is fixed to the floor 74.

When a plate 54 co-operates simultaneously with two perpendicular belts, the wheel 37 of the leg 28 from which the plate projects automatically swivels to the right direction by virtue of the drive forces exerted on the plate.

Thus, throughout the first phase, throughout the second phase, and also throughout the intermediate phase between the first and second phases, the position of the pallet is defined positively without any danger of play or slack. At all times, the wheels 37-1, 37-2, 37-3, and 37-4 extend in planes parallel to the direction of movement and thus wheel steering occurs automatically by virtue of the running means 36 being mounted to swivel about the vertical axes 43 and by virtue of the vertical axes being offset relative to the horizontal axes of rotation 38 of the respective wheels.

Figure 2:
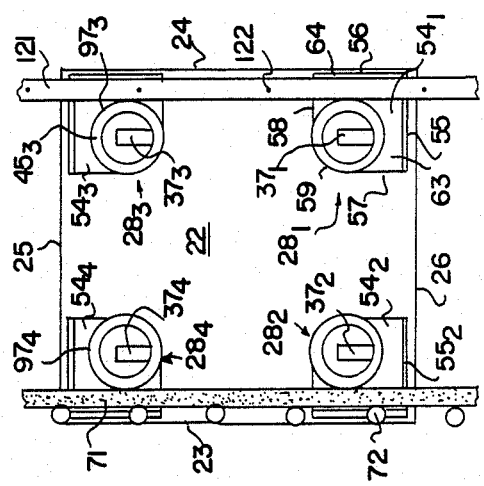
FIG. 2 is a plan view seen from the pallet underside while travelling and assuming the floor to be transparent.

In FIG. 2, a guide strip 121 is shown fixed in place by screws 122, with the strip being parallel to the row constituted by the successive guide whels 72 guiding the strand 71, with the guide strip co-operating with the outer cylindrical surface 53 of the rings $45_1$ and $45_3$ in order to perform said guidance.

FIG. 7 shows a portion of an installation for moving a pallet around a curved trajectory, for example around a semicircular trajectory. The pallet 21 initially follows a rectilinear trajectory 123 as imposed by a strand 128 of a belt and the rectilinear portion of a guide strip disposed on the opposite side of the pallet (and not shown in FIG. 7). The belt then passes round a wheel 125 and the guide strip is followed by a semicircular portion 136. FIG. 7 shows a pallet in the position which it occupies shortly before arriving at maximum distance from its entry zone. After passing through this position, the pallet continues its curved trajectory and returns to a rectilinear trajectory as shown diagrammatically by trajectory 127 of its center, which trajectory is parallel to the trajectory 123 and at a distance therefrom equal to the diameter of the interconnecting semicircle 128. In the trajectory 127, the pallet is driven by co-operation between its plates $54_3$ and $54_1$ and the strand of belt 128, and it is guided by its cylindrical rings $45_4$ and $45_2$ co-operating with the face of a guide strip provided for the purpose, the rings having previously contributed to guiding the pallel around the semicircle by co-operating with the inside face 129 of a curvilinear portion of guide strip 126.

In this embodiment, the side 23 of the pallet which was on the outside while the pallet was running along the upper part 123 remains on the outside when the pallet runs along the lower, parallel path. (Upper and lower being with respect to the orientation of the drawing).

Figure 8:
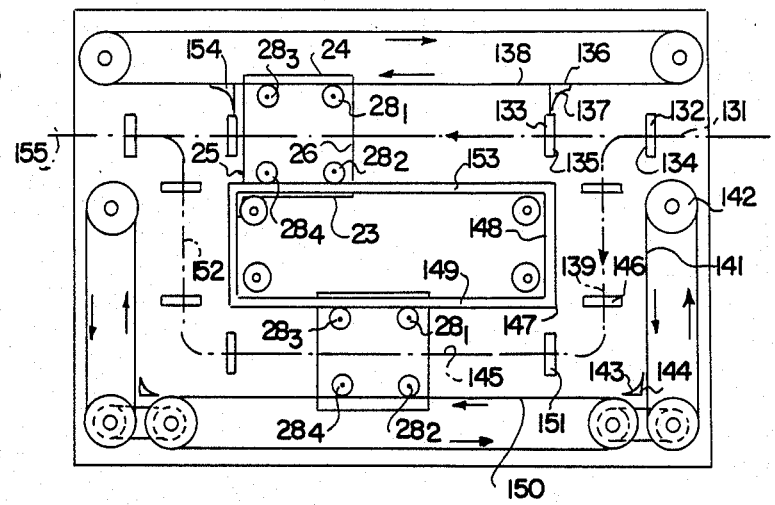
FIG. 8 is a diagrammatic plan view of a module or work station including the characteristics of the invention.

Reference is now made to FIG. 8 which shows a module forming a part of a flexible workshop or installation in accordance with the present invention and provided for moving pallets in the manner described above. In this module, pallets enter through a path 131 which extends a path provided by an adjacent module. At the entrance to path 131 there are two guide strips 132 and 133 whose operative faces 134 and 135 are perpendicular to the path 131, together with an abutment 136 having a curved operative face 137. A pallet arriving at the inlet to the path 131 and driven by a strand of belt 138 thus changes direction of movement without changing its orientation in a manner analogous to that described above with reference to FIG. 5. The pallet thus moves along the perpendicular path 139. It is moved along this path by the strand 141 of a second belt passing over a pulley 142.

The pallet then follows this path until its bottom right leg $28_2$ co-operates with the curved portion 143 of an abutment 144 and the pallet is caused to move along the path 145 perpendicular to the path 139 without changing its orientation in the manner described above with reference to FIGS. 5 and 6. As it moves, the pallet is held by a strip 146 and by the corner 147 between strips 148 and 149. Strip 151 is operative at the end of the pallet travel along the path 139.

Under drive from belt strand 150, the pallet arrives in the position shown, after which it may follow the path 152 parallel to the path 139 under conditions analogous to those described above.

It may also be stopped in any position along the length of path 145 by any appropriate means for the purpose of assembling and/or machining the part or parts carried by the pallet.

The invention provides for the abutment 136 having the curved face 137 to be retractable into the floor 74 of the module. When the abutment 136 is retracted, a pallet entering the path 131 continues straight along this path with floor continuity being provided by the top face of the retracted abutment 136, and pallet guidance is then provided by a strip 153. A pallet which has followed this course is shown at the far end of the path 131 where it is driven by co-operation between strand 138 and the plates on legs $28_3$ and $28_1$, with guidance being provided by the strip 153 co-operating with legs $28_4$ and $28_2$.

In order to allow the pallet to continue along the path 131, a curved abutment 154 is retracted into the floor 74. This curved abutment is used, in contrast, in order to deflect a pallet arriving thereat from the path 152 so that said pallet can also leave the module via the outlet 155.

Figure 9:
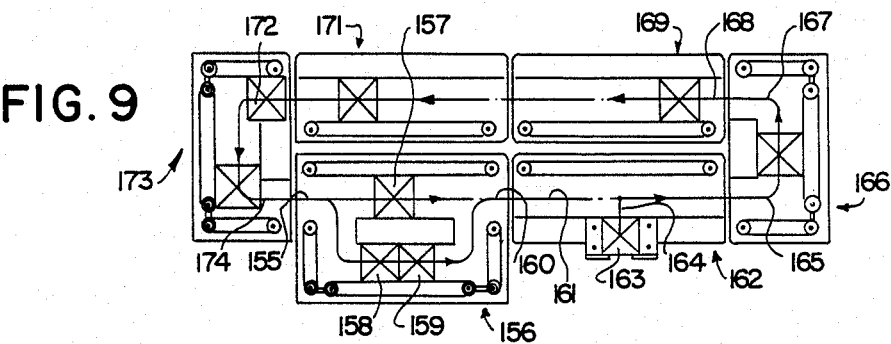
FIG. 9 is a diagrammatic plan view of an installation including the work station shown in FIG. 8.

Reference is now made to FIG. 9 which shows a flexible workshop in accordance with the present invention and including a module 156 of the type described with reference to FIG. 8.

In such module, the path length 155 is the inlet path and a pallet entering the module may either continue directly as shown at 157 or it may be switched to the outer path on which two pallets 158 and 159 are shown in positions in which they allow the parts they carry to be assembled and/or machined.

The outlet 160 from the module is connected to the inlet 161 of another module 162 provided for machining a part by means of a machine tool which includes an inlet port 163 into which a pallet is inserted by the path referenced 164 extending perpendicularly to the path 161. After machining, the pallet returns to the main path 161 which is connected to the inlet path 165 of another module 166 along which the pallet travels without changing its orientation following a U-shaped path. The outlet 167 from the module 166 is connected to the inlet 168 of a return module 169 which is of the same length as the module 162 and which is disposed adjacent thereto. The first return module runs into a second return module 171 disposed adjacent to the module 156 and extending over the same length. The outlet from the second return module runs into the inlet 172 of the module 173 which is identical to the module 166 and which has its outlet 174 connected to the inlet 155 of module 156. In such an installation, operative modules may be interchanged, thereby enabling an installation to be simply and rapidly transformed and thus providing flexibility.

The belts used for driving the pallets are shown diagrammatically on each of the modules.

Figure 10:
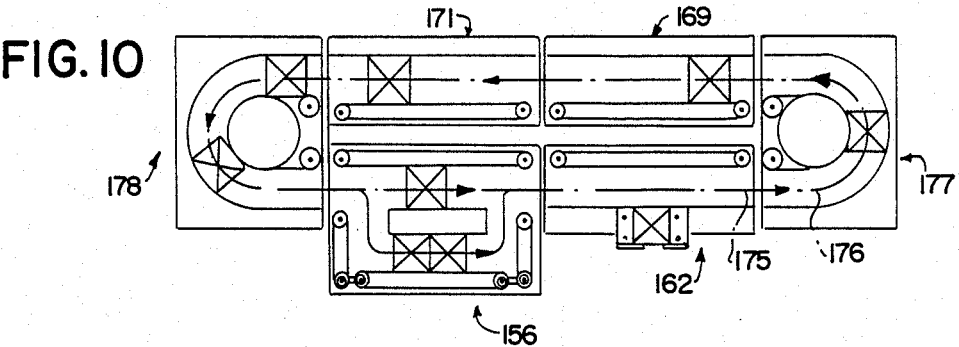
FIG. 10 is a view similar to FIG. 9 but including different end modules from those in the FIG. 9 installation for interconnecting the go and return paths.

In the embodiment shown in FIG. 10, modules 156, 162, 169, 171 are identical to the modules having the same reference numerals in the FIG. 9 embodiment. However, the outlet 175 from the module 162 runs into the inlet 176 of a module 177 in which the pallet does indeed follow a U-shaped path, but in which the orientation of the pallet is not maintained since in this module the pallet follows a path as described above with reference to FIG. 7. The face or side of the pallet which faces outwardly in the modules 156 and 162 thus remains outwardly-directed in modules 169 and 171. The module 171 is followed by a module 178 which is identical to the module 177.

Figure 11:
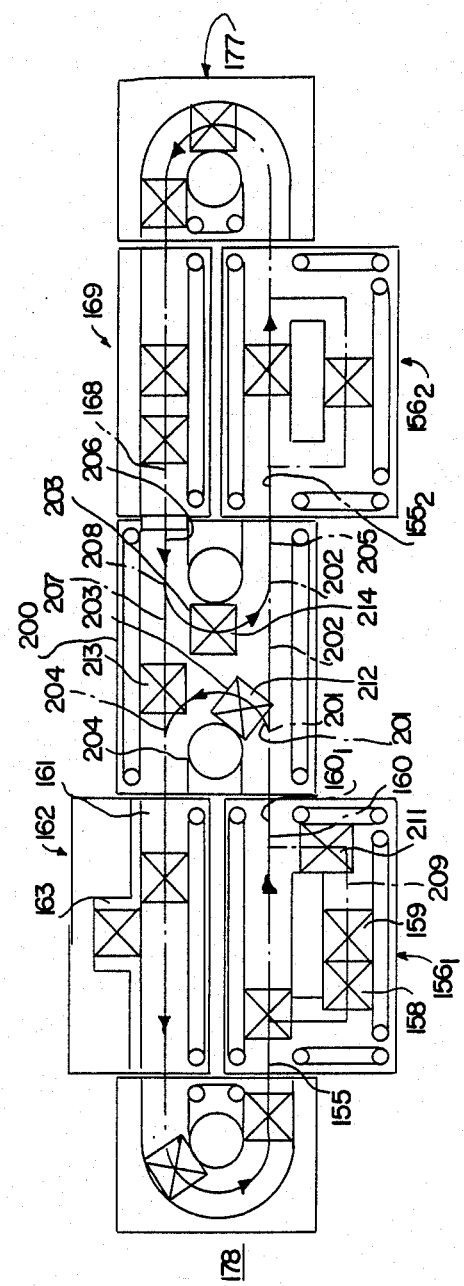
FIG. 11 is a view similar to FIG. 10, but showing another embodiment.

Reference is not made to FIG. 11 which shows an installation comprising two identical modules $156_1$ and $156_2$ which are also identical to the module 156 as shown in the FIG. 10 embodiment, and two end modules 177 and 178 which are identical to each other and to the end modules 177 and 178 of the FIG. 10 embodiment. The module 177 is followed by a module 169 which is identical to the module 169 shown in Figure 10 and is thus placed opposite the module $156_2$ in the lower row of modules. The module $156_1$ has a module 162 identical to the module 162 of the FIG. 10 embodiment placed adjacent thereto, i.e. a module which includes an inlet port 163.

A "short circuit" module 200 is disposed between the assembly constituted by the equal length modules $156_1$ and 163 and the assembly constituted by the equal length modules 169 and $156_2$, and the short circuit module comprises a first path 201 extending the path $160_1$ at the outlet from the module $156_1$. The path 201 extends rectilinearly at 202 in alignment with the path 201 and also in the form of a curved semicircular path 203 which connects to an outlet path 204 from the module 200, which outlet path is in alignment with the inlet path 161 to the module 162. The path 202 from the module 200 extends up to the outlet path 205 from said module which is connected with the inlet path $155_2$ of the module $156_2$.

The module 200 has a second inlet path 206 which lies in the extension of the path 168 of the return module 169. The inlet path 206 splits into a rectilinear path 207 in alignment with the inlet path 206 and running onto the outlet path 204 of the module 200, and also into a curved path 208 which connects to the outlet path 205 from the module 200.

In such an installation, a pallet may initially run along the module $156_1$ by running along its path 155 without the part carried by the pallet being diverted to the outer path 209, or else by causing the pallet to follow the outer path 209 on which two such pallets are shown at 158 and 159 ready for processing of the parts they carry.

At the outlet 160 from module $156_1$, regardless of whether the pallet has arrived there directly from inlet path 155 or by following the outer path 209 as shown at 211, the pallet enters the short circuit module 200 via its inlet path 201 and it may then be directed either towards the module 163 by following the curvilinear path 203 as shown at 212 or it may run along the entire length of the module 200 and exit into the module $156_2$.

Similarly, a pallet leaving the return module 169 may either run through the entire length of the module 200 following the path 207, as shown at 213, or it may be conveyed along the curved path 208 back to the module $156_2$ as shown at 214.

I claim:

1. A system for driving pallets adapted to support workpieces to be machined and/or assembled, comprising:
 a horizontal floor for movement of at least one pallet thereon, each pallet including rolling means which swivel in the direction of movement for running on said floor and which are operative to move the pallet in any direction on the floor,
 drive means for moving the pallet, said drive means including circulating drive means for cooperating with a friction means provided on each pallet, said friction means being operative for any orientation of the pallet during its changes of direction of movement.

2. A system according to claim 1, wherein said rolling means comprise swiveling wheels.

3. A system according to claim 2, wherein each swiveling wheel comprises a roller mounted on a support to rotate about a horizontal axis, said support being mounted to rotate about a vertical axis with said horizontal axis being offset from said vertical axis.

4. A system according to claim 1, wherein said circulating drive means includes circulating strands carried by said horizontal floor, and wherein said friction means is adapted to resiliently apply pressure against at least one of said circulating strands of said circulating drive means.

5. A system according to claim 4, wherein said friction means
 includes a spring-loaded plate.

6. A system according to claim 1, wherein the pallet is substantially rectangular and said friction means comprises a resilient pressure member in the vicinity of each of the corners of said pallet adapted to engage circulatig drive means for frictionally driving the pallet.

7. A system according to claim 1, wherein pegs are mounted on each pallet to cooperate with straight and curved abutment means which are fixed to the floor and guide the travel of the pallets.

8. A system according to claim 7, wherein said floor on which the pallets run includes a curved abutment mounted thereon and adapted for cooperating with a pallet peg to impose a curved course to the end of its trajectory along a first rectilinear path until it runs into a second rectilinear path thereby enabling the pallet to change the direction of travel without being subjected to shock and without change in its orientation.

9. A system according to claim 8, wherein each peg cooperating with the abutment and a guide means fixed to the floor incorporates a swiveling wheel and a resilient pressure member.

10. A system according to claim 7, wherein guide means are provided to impose upon a pallet a movement with constant change of its orientation.

11. A system according to claim 1, wherein a single resilient pressure member is suitable for cooperating with a first drive strand of circulating means and a second drive strand perpendicular to the first drive strand and situated at the same level.

12. A system according to claim 11, wherein two drive pulleys are provided for the two adjacent perpendicular strands and are interconnected by a belt interposed between grooves provided at the same level in both pulleys, and wherein a single motor is provided for driving both perpendicular strands.

13. A pallet for carrying a workpiece to be machined and/or assembled in a system including a horizontal floor and continuously circulating horizontal drive strands, said pallet comprising rolling means which swivel in the direction of movement for running on said floor and which are operative for any direction of movement of the pallet on the floor, and friction means provided on the pallet, said friction means adapted to engage said drive strands at any orientation of the pallet during its movement.

14. A pallet according to claim 13, wherein said rolling means comprise swiveling wheels.

15. A pallet according to claim 14, wherein each swiveling wheel comprises a roller mounted on a support to rotate about a horizontal axis said support being mounted about a vertical axis with said horizontal and vertical axis not intersecting each other.

16. A pallet according to claim 13, wherein said friction means applying pressure against the drive strands comprise resilient means.

17. A pallet according to claim 18, wherein said friction means comprise a plate spring-mounted on the pallet.

18. A pallet according to claim 13, comprising a pallet body and, at each of its corners, a friction plate for engaging the drive strands.

* * * * *